(12) United States Patent
Kreiner et al.

(10) Patent No.: US 7,224,698 B2
(45) Date of Patent: May 29, 2007

(54) EDGE SIDE ASSEMBLER

(75) Inventors: Barrett Morris Kreiner, Norcross, GA (US); Donna K. Hodges, Cumming, GA (US); Jonathan M. Peterson, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 1129 days.

(21) Appl. No.: 10/306,690

(22) Filed: Nov. 27, 2002

(65) Prior Publication Data

US 2004/0103313 A1 May 27, 2004

(51) Int. Cl.
*H04L 12/28* (2006.01)
*G06F 15/16* (2006.01)
*G06F 7/00* (2006.01)

(52) U.S. Cl. .................. 370/401; 370/389; 370/402; 709/206; 709/224

(58) Field of Classification Search ........ 370/389–402; 709/206–224, 229–231; 719/313–317
See application file for complete search history.

(56) References Cited

U.S. PATENT DOCUMENTS

| | | | |
|---|---|---|---|
| 5,418,628 A * | 5/1995 | Perkins .................. 358/468 |
| 5,924,074 A * | 7/1999 | Evans ...................... 705/3 |
| 6,002,689 A | 12/1999 | Christie et al. |
| 6,016,307 A | 1/2000 | Kaplan et al. |
| 6,026,091 A | 2/2000 | Christie et al. |
| 6,052,442 A * | 4/2000 | Cooper et al. ........... 379/88.19 |
| 6,098,138 A | 8/2000 | Martinelli et al. |
| 6,104,718 A | 8/2000 | Christie |
| 6,129,449 A | 10/2000 | McCain et al. |
| 6,178,170 B1 | 1/2001 | Duree et al. |
| 6,181,703 B1 | 1/2001 | Christie et al. |
| 6,226,686 B1 | 5/2001 | Rothschild et al. |
| 6,305,007 B1 * | 10/2001 | Mintz .................. 717/116 |
| 6,385,198 B1 | 5/2002 | Ofek et al. |
| 6,434,403 B1 | 8/2002 | Ausems et al. |
| 6,456,594 B1 | 9/2002 | Kaplan et al. |
| 6,466,236 B1 | 10/2002 | Pivowar et al. |
| 6,810,429 B1 * | 10/2004 | Walsh et al. ............ 709/246 |
| 6,973,479 B2 | 12/2005 | Brady et al. |
| 7,114,171 B2 | 9/2006 | Brady et al. |
| 7,117,246 B2 * | 10/2006 | Christenson et al. ........ 709/206 |
| 2002/0055917 A1 * | 5/2002 | Muraca ................... 707/1 |
| 2002/0136223 A1 | 9/2002 | Ho |
| 2002/0188689 A1 * | 12/2002 | Michael .................. 709/206 |
| 2004/0059598 A1 * | 3/2004 | Wellons et al. ............ 705/2 |
| 2004/0060056 A1 * | 3/2004 | Wellons et al. ........... 719/317 |
| 2004/0100974 A1 * | 5/2004 | Kreiner et al. ........... 370/401 |
| 2004/0100975 A1 * | 5/2004 | Kreiner et al. ........... 370/401 |

OTHER PUBLICATIONS

Software aims to put your life on disk, New Scientist.com, Nov. 20, 2002, http://www.newscientist.com/news/news.jsp?id=ns99993084.

* cited by examiner

*Primary Examiner*—Man U. Phan
(74) *Attorney, Agent, or Firm*—Bambi Faivre Walters; Geoff Sutcliffe; Todd Mitchem (57) ABSTRACT

Methods, systems, and apparatuses are disclosed for enabling a virtual personalized network. Communications are established with a personal digital gateway to control access, sharing, security, and/or management of up-to-date personalized data exchanged between or among a plurality of associated communications devices and/or communications networks. The associated communications devices are owned, operated, and/or accessed by a common user.

21 Claims, 8 Drawing Sheets

EDGE SIDE ASSEMBLER

CROSS REFERENCE TO RELATED APPLICATIONS

This application relates to applicants' co-pending application Ser. No. 10/306,504 entitled "Personal Digital Gateway," filed simultaneously herewith and of which the "Brief Summary of the Invention" and "Detailed Description of the Invention" sections are incorporated herein by this reference.

This application also relates to applicants' co-pending application Ser. No. 10/306,690 entitled "MultiPath Gateway Communications Device," filed simultaneously herewith and of which the "Brief Summary of the Invention" and "Detailed Description of the Invention" sections are incorporated herein by this reference.

This application also relates to applicants' co-pending application Ser. No. 10/209,102 entitled "File Conversion," filed Jul. 31, 2002, and of which the "Brief Summary of the Invention" and "Detailed Description of the Invention" sections are incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to computer systems, communications, and communication devices. More particularly, this invention is directed to methods and systems for a personal digital gateway that communicates with a linked communications device to automatically provide customized presentation, selection, and management of programs and/or data to the linked communications device.

2. Description of the Related Art

Electronic communications has experienced explosive growth, and more growth is planned as access increases and communications devices improve. This explosive growth is revolutionizing how people manage data shared among numerous communications devices. Each week, hundreds, if not thousands or more, of electronic documents, facsimiles, emails, and other proprietary data may be generated by or provided to a user (e.g., owner or operator of the communications device). The user may desire to have this data available on multiple communications devices, such as, for example, the user's personal digital assistant (PDA), the user's home personal computer (PC), the user's office PC, and the user's wireless telephone. Typically, each of these communications devices is customized in terms of software, hardware, and network configuration. For example, the wireless telephone and the home PC have different software applications, data processing, storage, management, and communications systems.

One of the biggest barriers to managing multiple communications devices is creating, accessing, and maintaining up-to-date personalized information. This personalized information can be exchanged or otherwise shared with each of the user's communications devices. For example, if the user wants to share contact information (e.g., name, phone numbers, addresses, etc.) between the wireless telephone and the home PC, then the user typically must enter this information twice—once on the wireless telephone and once on the home PC. If the user updates the contact information for his/her home PC, then this updated information is not communicated to the wireless phone and the user must update the wireless phone separately. Another barrier is providing this up-to-date personalized information in a standardized or otherwise compatible data format, depending on functionality limitations of the communications device, so that each of the communications devices has efficient and effective access to the information. For example, conventional wireless phones have limited functionality compared with the home PC. Typically, wireless telephones provide limited contact information, such as a telephone listing by name rather than full address books and/or calendars. Additionally, conventional wireless telephones are unable to run application/software packages and may have limited capabilities for transmitting, receiving, and displaying video data.

In addition to the above challenges, some communications devices of the user also set forth a variety of login identifications and/or passwords in order to provide privacy, authorization, and/or security for the communications device and/or the connected communications networks. For example, the wireless phone may have a security identifier that activates service over the wireless network. In addition, the wireless phone may have another security identifier that accesses a voice messaging service. Typically, these identifiers are created and managed by the user. However, in some instance, such as accessing the user's office PC, the user may not have control over creating and managing identifiers and passwords.

The above discussion illustrates how the sharing of up-to-date personalized information among various communications devices is creating a new foundation for a virtual personalized network setting. With this emerging virtual personalized network setting, what is needed is a personalized digital gateway that builds communications infrastructures to support and capitalize on the different communications devices of the user to provide up-to-date personalized information. Accordingly, personal digital gateway (PDG) information systems and components are needed that enable multiple communications devices to share, transfer, and/or access standardized or otherwise compatible up-to-date personalized information. Additionally, personal digital gateway systems and components are needed to customize presentation of the standardized up-to-date personalized information based on the functionalities of each communications device. Further, a need exists to improve notification, access, and management of the personalized information without investing millions of dollars in computer equipment, in networking infrastructures, in maintenance, and in training while also complying with security, authentication, and/or privacy requirements.

BRIEF SUMMARY OF THE INVENTION

The aforementioned problems and others are reduced by a personal digital gateway (PDG). This PDG provides an interface between different communications devices, networks, and systems and, thereby, provides universal access to and management of personalized information across a variety of communications devices. The PDG comprises systems and methods that leverage the assets of a connected communications device and/or communications networks to facilitate improved access, sharing, notification, security, and/or management of data exchanged between or among different communications devices and/or networks of a user. Some advantages of the PDG include increased ability of each connected communications device to flexibly manage and categorize data that is exchanged with other communications devices, provide access to up-to-date data (including user preferences, passwords, messages, files, bookmarked sites, etc.), and utilize a virtual personalized network to manage communications with communications networks, such as a public data network (e.g., Internet).

An embodiment of this invention describes a method of identifying data according to a rule-based engine to categorize the data; using an access agent of the rule-based engine to locate remote data; using a configuration agent of the rule-based engine to configure a query to retrieve remote data, using the security agent of the rule-based engine to access and to retrieve the remote data, integrating the data and the remote data, and using a configuration agent of the rule-based engine to format the integrated data. Typically, the selected communications device is a wireless communications device, a mobile phone, a wireless phone, a WAP phone, an IP phone, a satellite phone, a computer, a modem, a pager, a digital music device, a digital recording device, a personal digital assistant, an interactive television, a digital signal processor, and/or a Global Positioning System device. Additionally, the selected communications device may include a bar code reader, digital read-out equipment, and programmable appliances (e.g., ovens, answering machines, alarm systems, etc.). Still further, formatted, integrated data may be in a presentation format compatible with the personal digital gateway and/or the selected communications device. Further, the data is associated with a common user of the personal digital gateway, the communications network, and/or the selected communications device.

Various embodiments include the above described method with the personal digital gateway in communications with (1) a selected communications device, (2) a communications network, or (3) both the selected communications device and the communications network. According to these embodiments, the data is identified as: (1) data associated with an access agent, (2) data associated with a configuration agent, (3) data associated with a security agent, and (4) data associated with a management agent. For example, data associated the access agent may include information associated with means of communicating (e.g., wireless, wired, and optical media associated with the selected communications device and/or network), communications paths, routing instructions, and addresses. Still another example, data associated with the configuration agent may include information about hardware, software, and network configuration (including user preferences) of the selected communications device.

In a preferred embodiment, a rule-based application dataserver is used to run the rule-based engine. The rule-based application dataserver allows the user to control access, sharing, notification, security, and/or management of the data exchanged with the selected communications device via a PDG rule-based profile associated with the above categories. The rule-based application dataserver is provided by the personal digital gateway. In another embodiment, an Edge Side Assembly profile is used to further identify the data. The Edge Side Assembly profile is associated with a frequency of receiving the data preferences. For example, if the user checks a web site on a daily basis (that is not set up in the PDG rule-based profile), then the Edge Side Assembly (ESA) profile has the intelligence to integrate the web site as a bookmark. Still further, if the user stops checking the web site, then the ESA profile has the intelligence to remove the bookmark. Thus, the ESA profile helps to integrate a mobile virtual database of recently used/unused data into the personal digital gateway.

BRIEF DESCRIPTION OF THE DRAWINGS

The above and other embodiments, objects, uses, advantages, and novel features of this invention are more clearly understood by reference to the following description taken in connection with the accompanying figures, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, flowcharts, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

A personal digital gateway is a device that interfaces different communications devices, connected networks, and/or systems. The purpose of the personal digital gateway is to efficiently automate configuration and routing of data to different communications devices of a common user and to effectively manage this data and the different communications devices. The personal digital gateway leverages the assets of the connected communications device(s) in terms optimally using the connected software, hardware, equipment, networks, and/or other information technology assets. For example, the user's office PC may have a local and/or a wide area network that utilizes Ethernet, dedicated private lines, Frame Relay, ISDN, ATM, ADSL, and the like to provide a high speed connection to a data network, such as the Internet, Intranet, and/or Extranet. Some advantages of the PDG include increased ability of each connected communications device to flexibly manage and categorize data that is exchanged with other communications devices, provide access to up-to-date data (including user preferences, passwords, and messages), and utilize a virtual personalized network to manage communications with connected networks, such as the Internet.

As used herein, the term "communications device" includes wired and wireless communications devices, such as a mobile phone, a wireless phone, a Wireless Access Protocol (WAP) phone, a satellite phone a computer, a modem, a pager, a digital music device, a digital recording device, a personal digital assistant, an interactive television, a digital signal processor, and/or a Global Positioning System device. Additionally, the term "communications device" may include a bar code reader, digital read-out equipment, and/or programmable appliances (e.g., ovens, refrigerators, washers, and other appliances, answering machines, alarm systems, etc.). Further, as used herein, the term "data" includes electronic information, such as, for example facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, such as a grouping of emails associated with the user's personal Internet Service Provider and with the user's business electronic messaging system, and/or (4) profiles associated with configuration, authenticity, security, and others. In various embodiments, the data may be stored by the PDG, a peripheral storage device connected to the PDG, the selected communications device, a network connected with the selected communication device, and/or other connected networks. Thus, the PDG provides a virtual personalized network of universal data controlled by the user.

Figure 1:
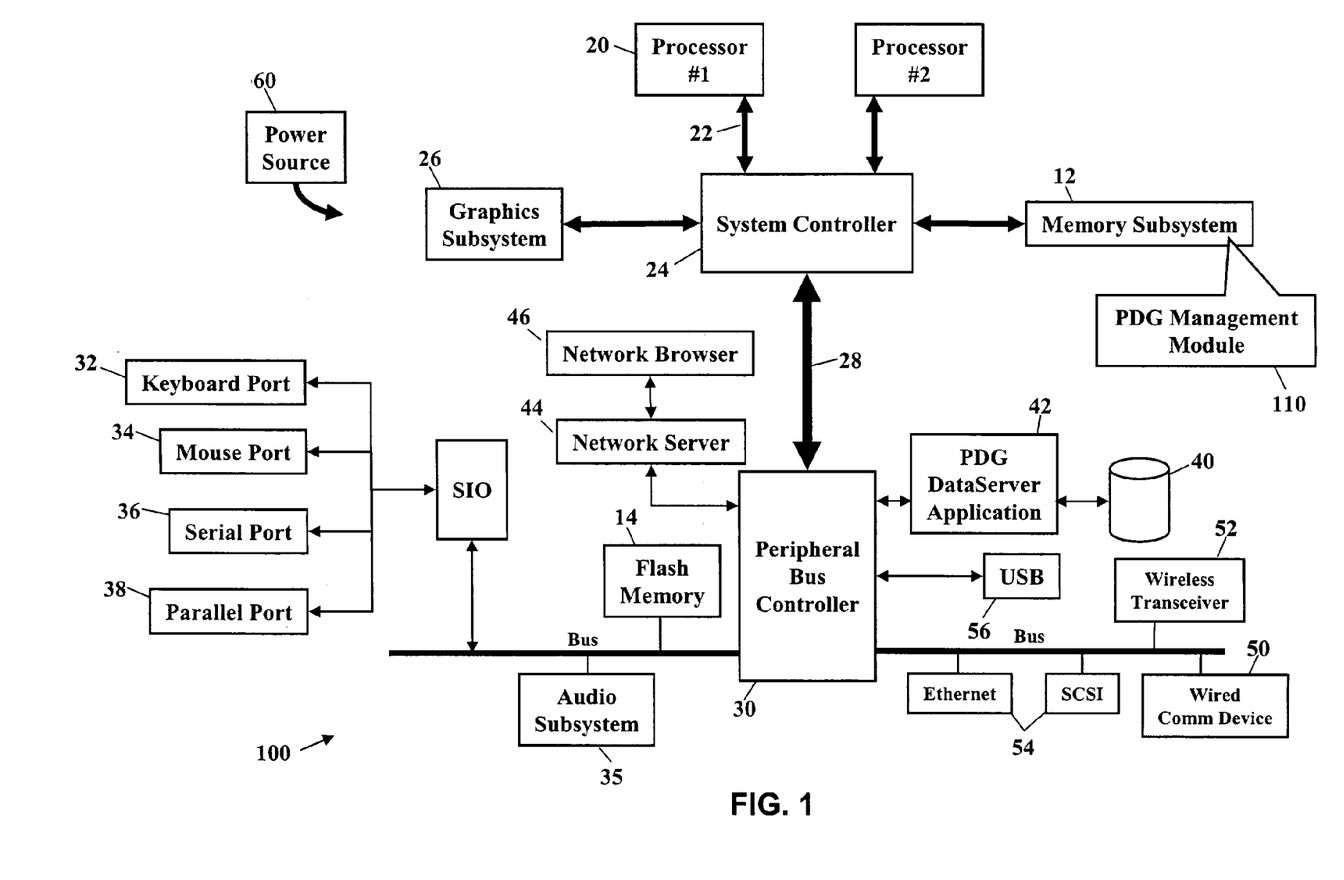
FIG. 1 is a block diagram showing of an exemplary Personal Digital Gateway (PDG) according to an embodiment of this invention.

Referring now to the figures, FIG. 1 is a block diagram showing a PDG Management Module 110 residing in a personal digital gateway 100. The PDG Management Module 110 operates within a system memory device. The PDG Management Module 110, for example, is shown residing in a memory subsystem 12. The PDG Management Module 110, however, could also reside in flash memory 14 and/or in a peripheral storage device, such as storage device 40 associated with a PDG rule-based dataserver 42. The personal digital gateway 100 also has one or more central processors 20 executing an operating system. The operating system, as is well known, has a set of instructions that control the internal functions of the personal digital gateway 100. A system bus 22 communicates signals, such as data signals, control signals, and address signals, between the central processors 20 and a system controller 24 (typically called a "Northbridge"). The system controller 24 provides a bridging function between the one or more central processors 20, a graphics subsystem 26, the memory subsystem 12, and a PCI (Peripheral Controller Interface) bus 28. The PCI bus 28 is controlled by a Peripheral Bus Controller 30. The Peripheral Bus Controller 30 (typically called a "Southbridge") is an integrated circuit that serves as an input/output hub for various peripheral ports. These peripheral ports could include, for example, a keyboard port 32, a mouse port 34, a serial port 36 and/or a parallel port 38. Additionally, these peripheral ports would allow the personal digital gateway to communicate with a variety of communications devices through ports 54 (such as SCSI or Ethernet), Wireless Transceiver 52 (using the IEEE Wireless standard 802.11 and Infrared), and Wired Comm Device Port 50 (such as modem V90+ and compact flash slots). The Peripheral Bus Controller 30 could also include an audio subsystem 35. Additionally, the personal digital gateway may include a network server 44 operating with a network browser 46. The network server 44 and the network browser 46 may be stand alone components or they may be integrated into the PDG dataserver 42. Still further, the personal digital gateway 100 may include a power source 60, such as a rechargeable battery to provide power and allow the personal digital gateway 100 to be portable.

The processor 20 is typically a microprocessor. Advanced Micro Devices, Inc., for example, manufactures a full line of microprocessors, such as the ATHLON™ (ATHLON™ is a trademark of Advanced Micro Devices, Inc., One AMD Place, P.O. Box 3453, Sunnyvale, Calif. 94088-3453, 408.732.2400, 800.538.8450, www.amd.com). Sun Microsystems also designs and manufactures microprocessors (Sun Microsystems, Inc., 901 San Antonio Road, Palo Alto Calif. 94303, www.sun.com). The Intel Corporation manufactures microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com).

The preferred operating system is a LINUX® or a RED HAT® LINUX-based system (LINUX® is a registered trademark of Linus Torvalds and RED HAT® is a registered trademark of Red Hat, Inc., Research Triangle Park, N.C., 1-888-733-4281, www.redhat.com). Other operating systems, however, may be suitable. Such other operating systems would include a UNIX®-based system (UNIX® is a registered trademark of The Open Group, 44 Montgomery Street, Suite 960, San Francisco, Calif. 94104, 415.374.8280, www.opengroup.org). and Mac® OS (Mac® is a registered trademark of Apple Computer, Inc., 1 Infinite Loop, Cupertino, Calif. 95014, 408.996.1010, www.apple.com). Another operating system would include DOS-based systems. WINDOWS® and WINDOWS NT® are common examples of DOS-based systems (WINDOWS® and WINDOWS NT® are registered trademarks of Microsoft Corporation, One Microsoft Way, Redmond Wash. 98052-6399, 425.882.8080, www.Microsoft.com).

The system memory device (shown as memory subsystem 12, flash memory 14, or peripheral storage device 40) may also contain one or more application programs. For example, an application program may cooperate with the operating system and with a video display unit (via the serial port 36 and/or the parallel port 38) to provide a Graphical User Interface (GUI) for the PDG Management Module 110. The GUI typically includes a combination of signals communicated along the keyboard port 32 and the mouse port 34. The GUI provides a convenient visual and/or audible interface with the user of the personal digital gateway 100. As is apparent to those of ordinary skill in the art, the selection and arrangement of the PDG Management Module 110 may be programmed over a variety of alternate mediums, such as, for example, a voice-activated menu prompt.

Figure 2:
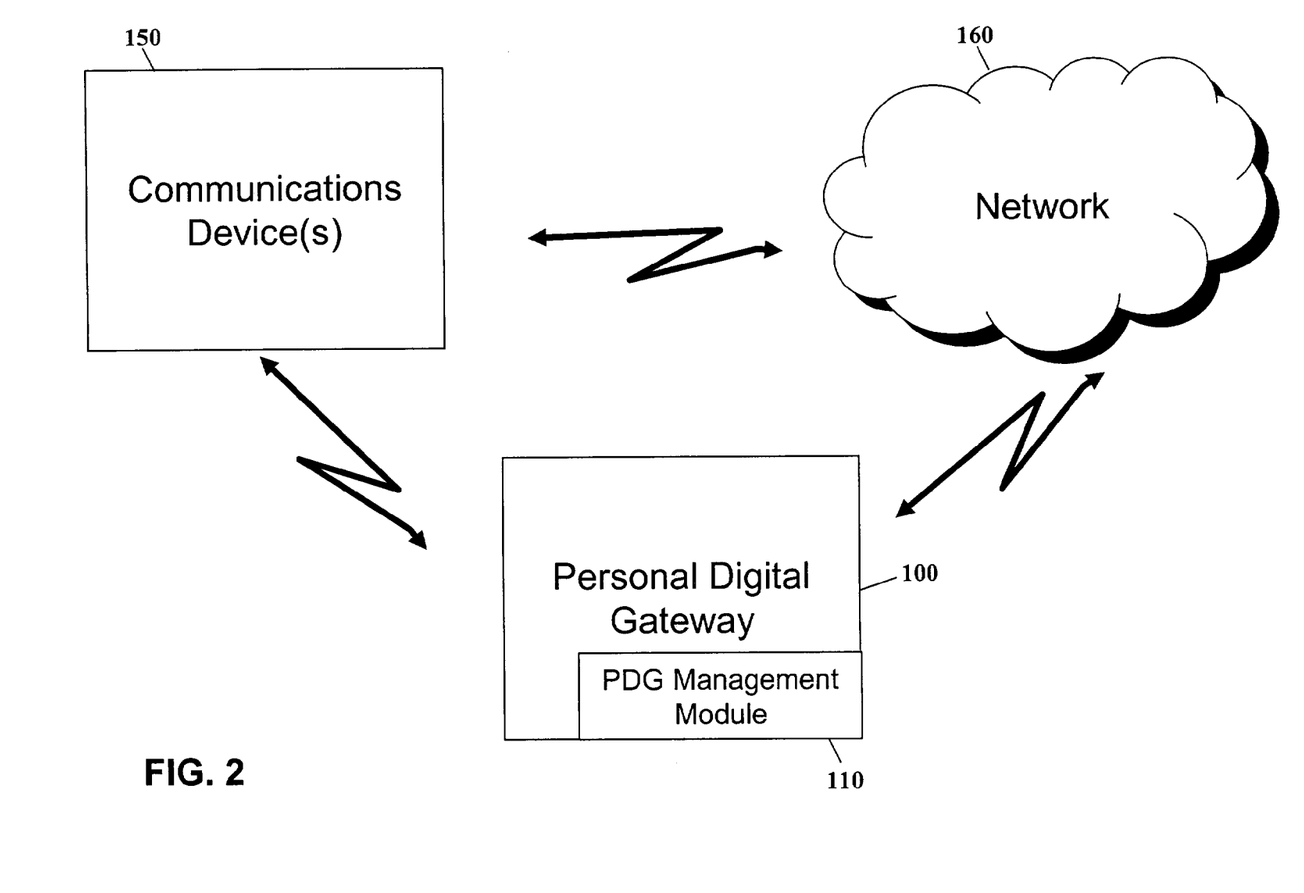
FIG. 2 is a schematic showing an exemplary operating environment for a PDG according to an embodiment of this invention.
Figure 3:
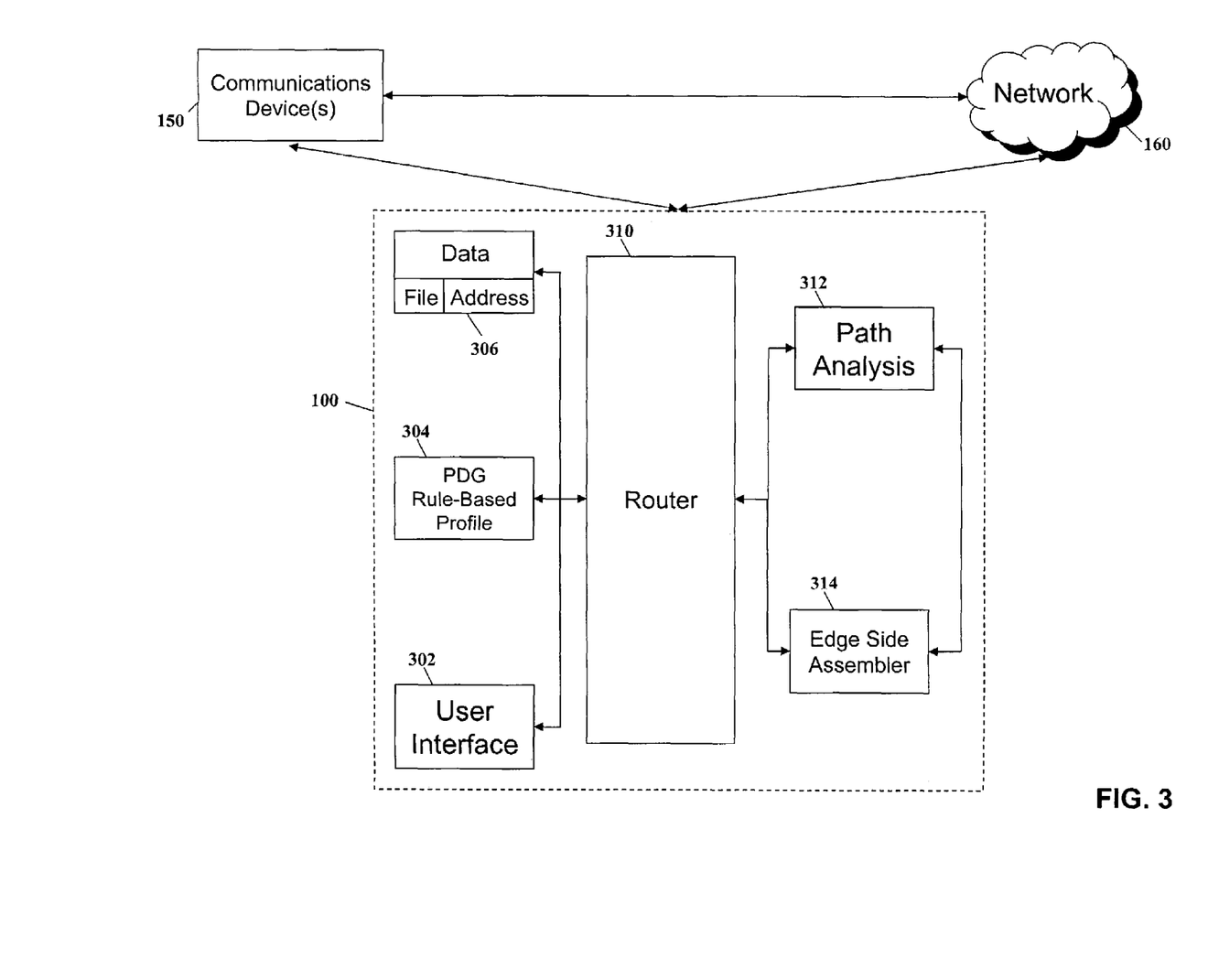
FIG. 3 is a functional block diagram showing an exemplary PDG connected with a communications device and associated network according to an embodiment of this invention.

FIG. 2 is an exemplary operating environment that illustrates the personal digital gateway 100 communicating with a communications device 150 and with a network 160. The communications device 150 and the network 160 may also communicate with each other (e.g., Office PC shown as reference numeral 603 and shared, interconnected network 670 of FIG. 6). FIG. 3 shows another exemplary operating environment with additional details of how the user may interact with a User Interface 302 to select a PDG Rule-Based Profile 304 and/or the data 306 to communicate with the communications device 150 and/or network 160. A router 310 of the personal digital gateway 100 chooses a communications path 312 and an Edge Side Assembler 314 accesses, integrates, and configures the data 306 (including remote data that is stored within the communications device 150 and/or network 160) to communicate with the communications device 150 (or, alternatively, with the personal digital gateway 100). While FIG. 3 shows the personal digital gateway 100 comprising the User Interface 302, the PDG Rule-Based Profile 304, the data 306, the router 310, the communications path analyzer 312, and the Edge Side Assembler 314, each may be separate components. The router 310, for example, may be a stand-alone -component communicating with the other components.

The PDG Management Module 110 of the personal digital gateway 100 allows a user to manage protocol transfer across a variety of communications devices and networks and to manage communications of mobile data associated with the personal digital gateway 100. For example, PDG Management Module 110 allows: (1) the user to customize one or more PDG rule-based profiles 304 of a rule-based application dataserver (shown as reference numeral 42 in FIG. 1) including a configuration agent (e.g., MyCommController), a security agent (e.g., MyCredentials), an access agent (e.g., MyProfile), a management agent (e.g., MyPDGTools), and data associated with the common user (e.g., MyMobileInfo); (2) the user to customize presentation, features, and/or management of communications between the personal digital gateway 100 and the communications device 150; and (3) the user to manage network connection(s) of the personal digital gateway 100 and/or the communications device 150. For example, the user may select a configuration agent (MyCommController) having a list of communications devices (e.g., personal digital assistant, mobile phone, home PC, office PC, MP3 player, etc.) and add to, delete from, and/or modify the configuration profile of the communications device, such as, connectivity parameters and device functionality parameters (e.g., capability to present audio or video and capability to run portable applications). This information is stored with the PDG Rule-Based Profile 304 of the connected communications device 150 and may act as a trigger for routing, configuring, and formatting communications including data 306 associated with the rule-based application dataserver 42. The PDG Management Module 110 also allows the user to customize features, such as data handling options. For example, the PDG Management Module 110 may split a display screen of the selected communications device (and/or personal digital gateway 100) into two viewing areas and present the management controls (e.g., access agent, security agent, etc.) in one portion and present the data that has been or that might be integrated for communications between the personal digital gateway 100 and the connected communications device 150 in the other portion. Further, the PDG Management Module 110 may allow the user to control whether to accept, decline, or postpone integration of the data with the connected communications device 150, or alternatively, may be set to automatically accept, decline, or postpone integration depending on rules contained in the PDG rule-based profile 304. Still further, the PDG Management Module 110 of the personal digital gateway 100 allows a user to control additional processing of the data, such as editing the data, copying the data, deleting the data, associating the data with remote data, links, and otherwise related data linking the data, storing the data, administering the data, compressing the data, and uncompressing the data (via MyPDGTools) and encrypting/decrypting the data (via MyCredentials). Finally, the PDG Management Module 110 of the personal digital gateway 100 may provide a network address, such as an IP address or the like, of the connected communications device 150 so that a connected network 160, such as a telecommunications network and/or a data network, can communicate the data (e.g., remote data and/or linked data) and, thus integrate telephony events and data network events with the user's connected communications device 150.

The PDG Rule-Based DataServer Application 42 (also referred to herein as the "PDG DataServer") functions as an intelligent server, database, and processor that is dedicated to managing personal digital gateway activity including communications with the connected communications device 150 and/or the connected network 160. The PDG DataServer 42 stores one or more PDG Rule-Based Profiles 304 that include data and/or applications associated with various agents, including MyCommController, MyCredentials, MyProfile, MyPDGTools, and/or a troubleshooting agent. For example, MyCredentials may contain a variety of fields and/or files associated with at least one of the following: login information associated with the user, password associated with the user, telephone number and/or Service Node of the user, TCP/IP address of the user, other addresses and passwords associated with a communications device and/or network of the user, and encryption/decryption tools. Still another example includes MyCommController that may contain a variety of fields and/or files associated with presentation formats for various communications devices and other information associated with the communications signal, size, and content of data, display of a GUI (e.g., color, font, placement of PDG Management Module 110 on screen, etc.), and other selections related to PDG management, such as routing and troubleshooting problems or error messages.

In an embodiment, the PDG Rule-Based Profile 304 contains a MyMobileInfo database including links or address of remote data and linked data, thereby providing a mobile virtual database. The MyMobileInfo may also contain rules associated with and databases for (1) file storage of mobile data (i.e., MyFiles), (2) file storage backup (i.e., MyBackupGateway), (3) personal journal storage (i.e., MyJournal), (4) bookmarks, cookies, caches, and other networked links (i.e., MyBookmarks), (5) copy and paste features (i.e., MyClipboard), (6) personal profiles and preferences, such groupings, categories, timing sequences to automatically refresh linked sites, etc. (i.e., MyProfile), and (7) identification, authentication, and security credentials for associated communications devices, such as username, password, etc. (i.e., data associated with MyCredentials).

Additionally, the PDG Rule-Based Profile 304 may contain information from other engines. For example, MyCommController engine provides rules and databases for creating, accessing, and/or otherwise managing communications with associated communications devices that can be connected with the personal digital gateway 100. MyCommController maintains information about each communications device, such as communications medium (e.g., via Infrared connection, USB connection, the family of IEEE 802.11 standards, etc.) and network routing. For example, network routing provides a virtual private router that tunnels the user's network access to any communications device connected with the personal digital gateway 100. Still further, the PDG Management Module 110 may contain another engine, MyPersonalContentDistributor, that provides rules and databases for creating, sharing, and/or otherwise managing data that can be distributed through the connected communications device 150 and/or the network 160. For example, in an embodiment, when data associated with a work file co-authored with other individuals is updated, a mail message with the attached updated file is generated and sent to co-authors. The user may confirm sending the generated message, or alternatively, the message may be automatically sent using routing instructions. Still another example according to another embodiment includes sending a query to a list of contacts whenever a picture is uploaded or otherwise detected by the personal digital gateway 100. The query may be sent as an email to advise contacts of the picture and ask if the contact would like a copy. If so, the contact can select a link contained in the email and download a copy of the picture. Additionally, the contact may be charged an automatic fee that is programmed with the downloading of the picture and the fee may be communicated back to and accounted for by the personal digital gateway 100 or the communications device 150.

Figure 4:
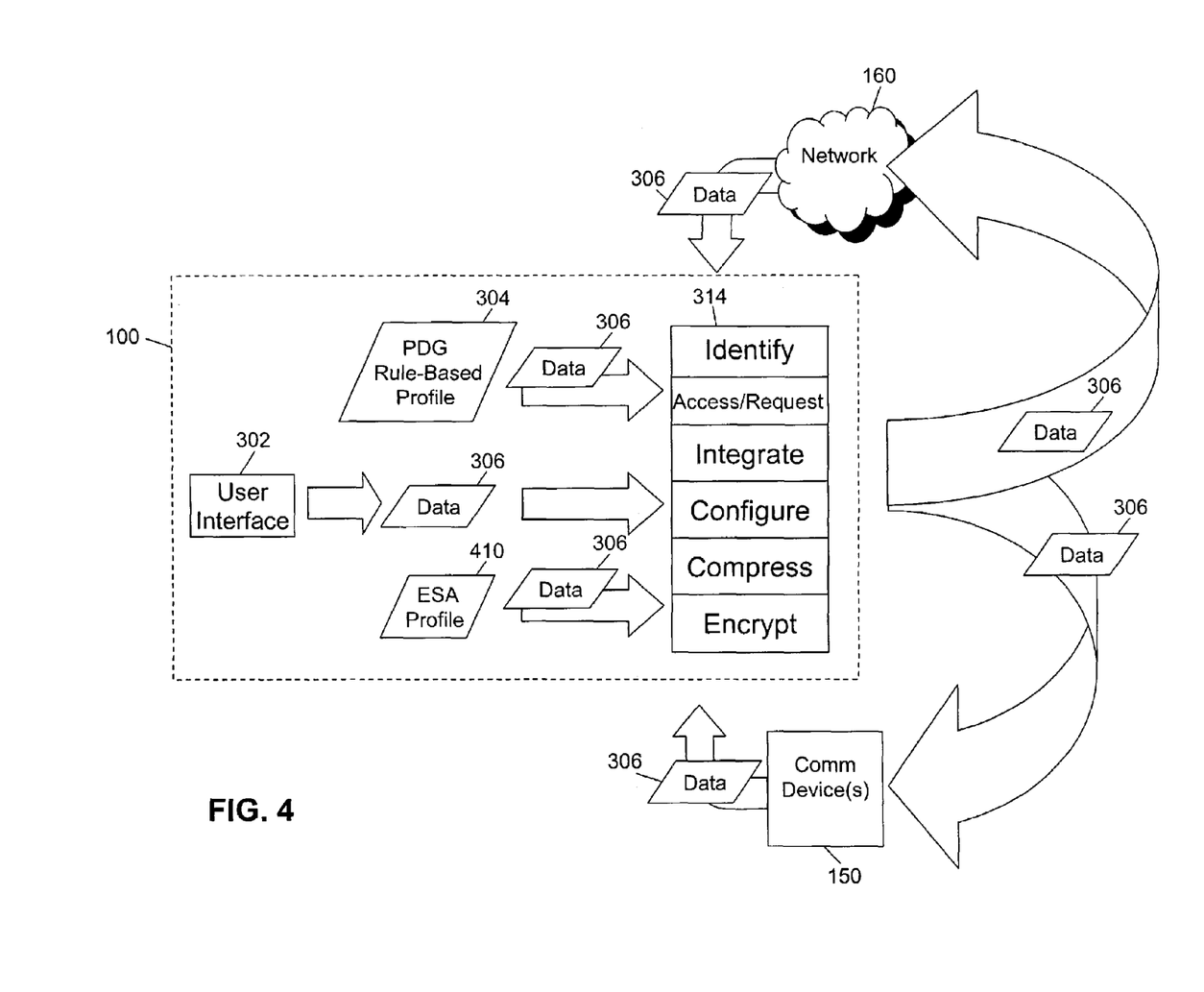
FIG. 4 is a schematic showing an exemplary configuration of the data flow through a PDG, a connected communications device, and/or a connected network according to an embodiment of this invention.

FIG. 4 is a schematic illustrating an exemplary framework of the data flow through a PDG, a connected communications device, and/or a connected network according to an embodiment of this invention. The user (not shown) of the personal digital gateway 100 may use the User Interface 302 to input and/or otherwise identify data 306 (e.g., inserting a compact disc of data into a locally connected storage device, such as reference numeral 610 in FIG. 6 or inputting an address, such as a domain name into a network browser). Thereafter, the user may select the PDG Rule-Based Profile 304 to associate, or alternatively, the personal digital gateway may automatically associate the Rule-Based Profile 304 (such as when MyProximityDetector identifies the communications device 150 within a selected proximity and initiates communications). The PDG Rule-Based Profile 304 and the data 306 are processed by the Edge Side Assembler 314. The Edge Side Assembler 314 identifies the data 306 (including data 306 associated with the PDG Rule-Based Profile 304), locates remote data, and associates the Edge Side Assembly profile (410) (if available). Next, the Edge Side Assembler 314 configures a query for remote data 306, accesses the communications device 150 and/or the network 160 to execute the query, receives the remote data 306, and integrates the remote data 306 with data 306 associated with the PDG Rule-Based Profile 304 and/or ESA Profile 410. Thereafter, the Edge Side Assembler 314 formats/configures the integrated data 306 for a presentation by the communications device 150, or alternatively, by the personal digital gateway. Additionally, the Edge Side Assembler 314 may compress and/or decompress data 306 communicated with the communications device 150, the network 160, and the personal digital gateway (e.g., local storage device 610 shown in FIG. 6). Still further, the Edge Side Assembler may encrypt and/or decrypt data 306 communicated with the communications device 150, the network 160, and the personal digital gateway.

Figure 5:
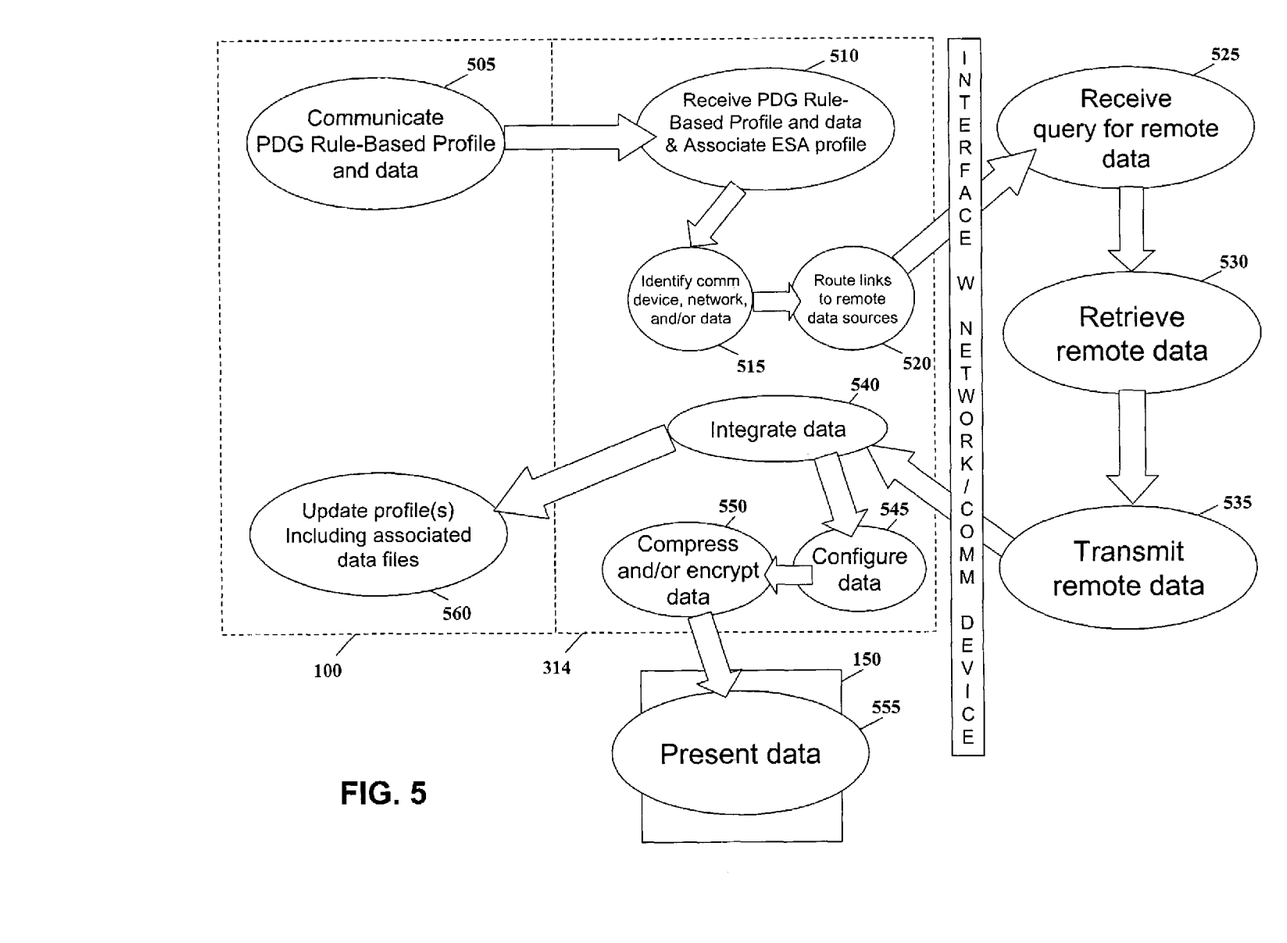
FIG. 5 is a flow diagram illustrating the flow of data through a PDG, a connected communications device, and a network according to an embodiment of this invention.

FIG. 5 is an exemplary flow diagram of the flow of the data 306 through the personal digital gateway 100, communications device 150, and/or network 160. Typically, the flow of the data 306 involves the user using the personal digital gateway 100 to communicate the PDG Rule-Based Profile 304 and/or data 306 (including locally stored data and associated remote and/or linked data) (step 505). The PDG Rule-Based Profile 304 and data 306 are routed to and received by the communications device 150 and, if applicable, the ESA profile 410 associates additional data (step 510). The Edge Side Assembler 314 determines whether external network(s) 160 and/or communications devices 150 need to be queried for remote data 306 and/or for refreshing linked data 306 (step 515). If so, the Edge Side Assembler 314 establishes communications with the network 160 and/or communications device 150 and routes a query to retrieve the remote and/or linked data 306 (step 520). The network 160 and/or communications device 150 receives the query (step 525), retrieves the data (step 530), and transmits the data 306 to the personal digital gateway 100 150 (step 535). Thereafter, the personal digital gateway 100 receives, integrates (step 540), and configures (step 545) the data (including remote and linked data) 306 for compatible exchange with the personal digital gateway 100, the connected communications device 150, and/or the connected network 160. Additionally, the data 306 may be compressed and/or encrypted (step 550) and presented to the communications device 150 (step 555). Typically, the Edge Side Assembler 314 is integrated into the personal digital gateway 100. Alternatively, the Edge Side Assembler 314 may be a stand alone system (not shown in the figures), may be integrated into a connected communications device 150, and/or may be integrated into the network 160. No matter how the Edge Side Assembler 314 is deployed, the data 306 is integrated and processed so that it is compatible for presentation by the communications device 150 (step 445) (or alternatively, by the personal digital gateway 100 (not shown)). Thereafter, the PDG Rule-Based Profile 304, ESA profile 410, and/or data 306 (e.g., associated data files stored on local storage device 610 shown in FIG. 6) may be updated (step 560). For example, in an embodiment, the PDG Rule-Based Profile 304 may contain rules for refreshing a bookmark associated with a connected network such that a collection of bookmarks are stored over time that show a specific version of the data associated with the bookmark and a date stamp. While the process in FIG. 5 is generally shown in series, the process may occur in different orders and/or at simultaneous times as one of ordinary skill in the art will understand.

Figure 6:
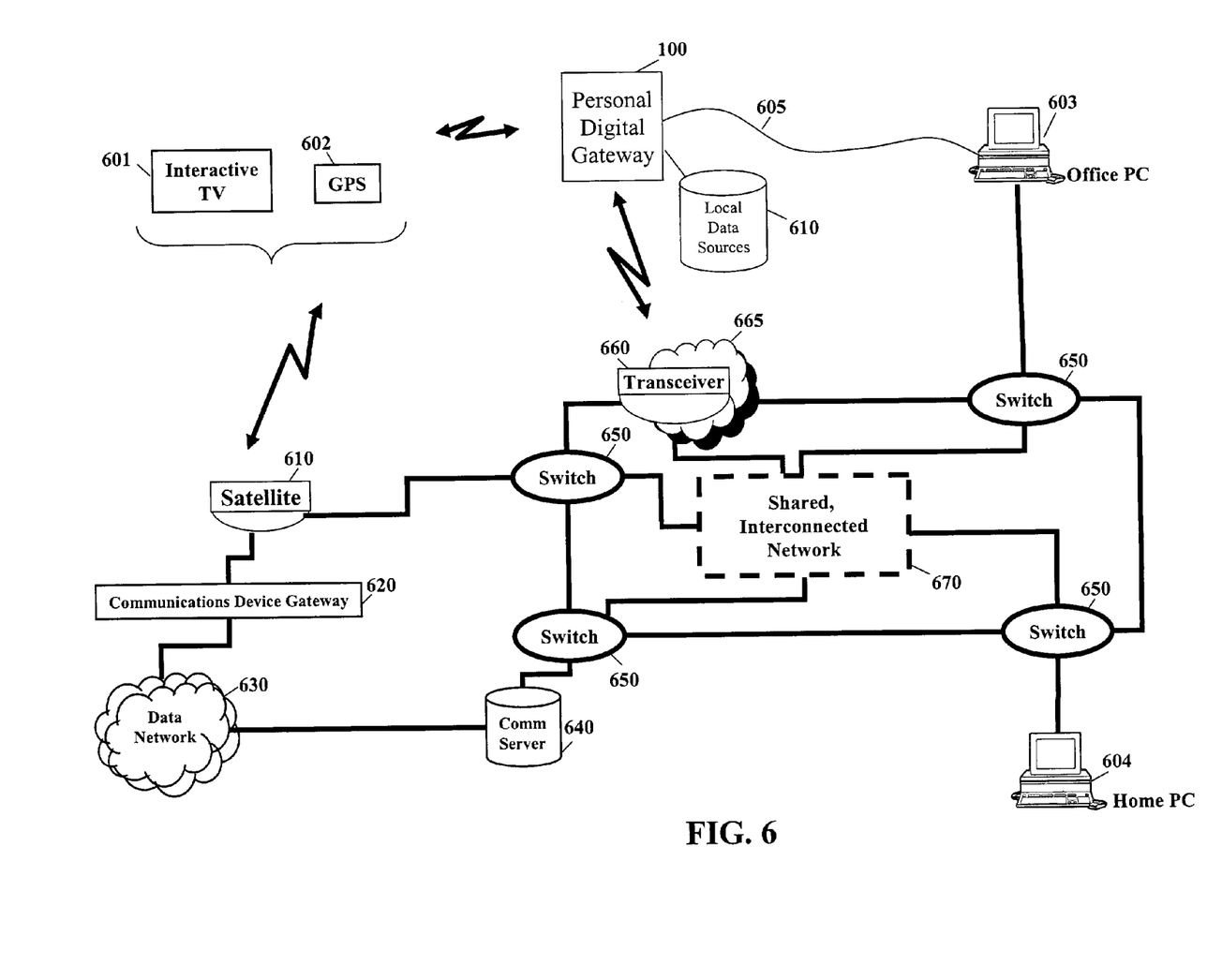
FIG. 6 is a schematic showing an exemplary embodiment of a PDG, a plurality of communications devices, and at least one network communicating data according to an embodiment of this invention.
Figure 7:
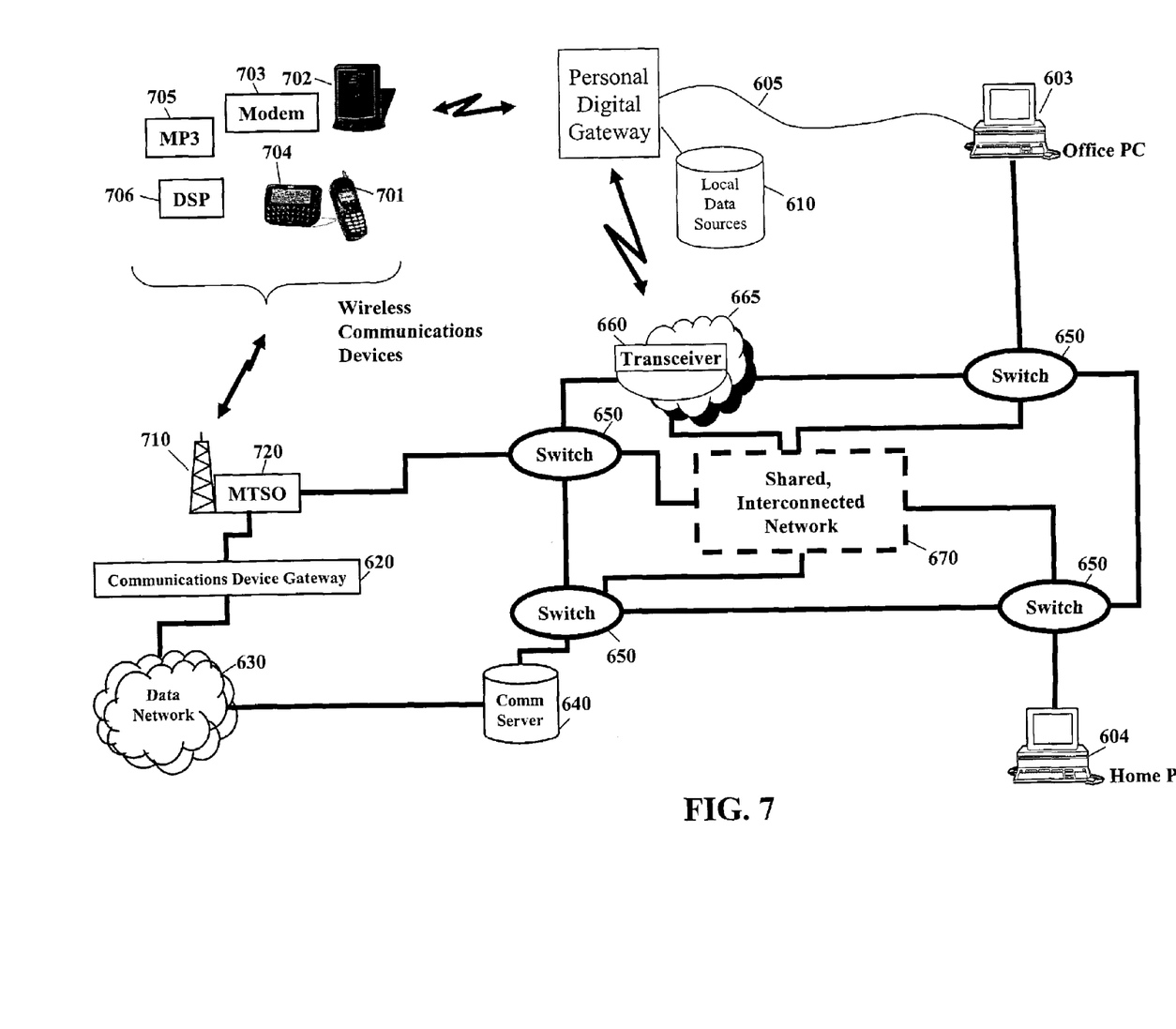
FIG. 7 is a schematic showing another exemplary embodiment of a PDG, a plurality of communications devices, and at least one network communicating data according to an embodiment of this invention.

FIGS. 6-7 are schematics showing the personal digital gateway 100 communicating with a variety of wireless and wired communications devices (shown as reference numerals 601-602 in FIG. 6 and reference numerals 701-706 in FIG. 7) and a communications network (shown as reference numeral 670 in FIG. 6) according to other embodiments of this invention. The means of communicating the data 306 between or among the personal digital gateway 100, the communications device, and the communications network include a variety of means, including optical transmission of data (e.g., any medium capable of optically transmitting the data), wireless transmission of data (e.g., wireless communications of the data using any portion of the electromagnetic spectrum), and/or fixed-wire transmission of data (e.g., any medium capable of transmitting electrons along a conductor). Fiber optic technologies, spectrum multiplexing (such as Dense Wave Division Multiplexing), Ethernet and Gigabit Ethernet services, Infrared, the family of IEEE 802.11 standards, and Digital Subscriber Lines (DSL) are just some examples of the transmission means.

FIG. 6 illustrates a virtual personalized network system that includes the personal digital gateway 100 coupled with a local storage device 610, a variety of communications devices that include an interactive television 601, a Global Positioning System (GPS) transceiver 602, an office personal computer (PC) 603, and a home PC 604, a communications cable 605, a satellite transceiver 610, a communications device gateway 620, a communications device data network 620, a communications device server 640, at least one switch 650, a wireless transceiver 660, a transceiver network 665, and a shared, interconnected network 670. In an embodiment, the personal digital gateway 100 transmits and receives signals with one of the wireless communications devices (i.e., the interactive television 501 or the GPS transceiver 602) to communicate data 306. For example, the personal digital gateway 100 may communicate with the interactive television 601 to communicate data stored on the local data source 610 and data stored on a remote data source, such as, for example a data storage device of the home PC 604 (the home PC 604 is accessed via the shared, interconnected network 670). The interactive television 601 communicates via an antenna (not shown) with the satellite 610 that transmits a request for the remote and/or linked data through the communications device gateway 620 connected to the communications device network 630. If necessary, the communications device network 630 routes the request for the remote and/or linked data through a communications server 640 and switch 650 to the shared, interconnected network 670. Alternatively, the personal digital gateway 100 may communicate the data 306 with the transceiver 660 and an associated transceiver network 665 that routes communications directly to the shared, interconnected network 670. The shared, interconnected network 670 can access other connected networks and communications devices. For example, the shared, interconnected network 670 could access the home PC 604 through switch 650 to retrieve data from a hard drive of the home PC 604. The shared, interconnected network 670 transmits the remote and/or linked data back through the communications path to the interactive television 601 or, alternatively, to the personal digital gateway 100 for integration and presentation formatting by the Edge Side Assembler 314. Additionally, the shared, interconnected network 670 could transmit the data back to a connected communications device via another communications path. For example, the data could be transmitted from the shared, interconnected network to switch 650 coupled with the office PC 603 wired over communications cable 605 to the personal digital assistant 100 to communicate to the interactive television 601. The interactive television 601 could alternatively communicate via a fixed transmission path, such as a cable line and/or a telephone line (neither shown), to communicate a request for the remote data 306 and/or linked data 306.

FIG. 7 illustrates a virtual personalized network system that includes the personal digital gateway 100 coupled with a local storage device 610, a variety of communications devices that include a mobile phone 701, a personal digital assistant (PDA) 702, an interactive pager 703, a modem 704, an MP3 player, a digital signal processor 706, an office personal computer (PC) 603, and a home PC 604, a communications cable 605, an antenna 710, a mobile switching telephone office (MTSO) 720, a communications device gateway 620, a communications device data network 620, a communications device server 640, at least one switch 650, and a shared, interconnected network 670. In an embodiment, the personal digital gateway 100 transmits and receives signals with one of the wireless communications devices (i.e., shown as reference numerals 701-706) to communicate data 306. For example, the personal digital gateway 100 may communicate with the mobile phone 701 to communicate data stored on the local data source 610 and data stored on a remote data source, such as, for example a data storage device of the home PC 604 (the home PC 604 is accessed via the shared, interconnected network 670). The mobile phone 701 communicates via an antenna 710 to the MTSO 720, and the MTSO 720 forwards a request for the remote data 306 and/or linked data 306 to the shared, interconnected network 670. The request from the MTSO 720 may be routed either through the switch 650 directly or through the communications device gateway 620, the communications device network 630, the communications device network 630, the communications server 640, and switch 650. Alternatively, the personal digital gateway 100 may communicate the data 306 with the transceiver 660 and an associated transceiver network 665 that routes communications directly to the shared, interconnected network 670. As described above for FIG. 6, the shared, interconnected network 670 can access other connected networks and communications devices. The shared, interconnected network 670 transmits the remote and/or linked data back through the communications path to the interactive mobile phone 701 or, alternatively, to the personal digital gateway 100 for integration and presentation formatting by the Edge Side Assembler 314. Additionally, as described above for FIG. 6, the shared, interconnected network 670 could transmit the data back to a connected communications device via another communications path.

Because of the mobility of the personal digital gateway 100, the ability of the personal digital gateway 100 to communicate the data 306 over a variety of paths allows the personal digital gateway 100 to dynamically communicate with a variety of communications devices based on the proximity of a communications device. For example, if the user is moving about, the personal digital gateway 100, may automatically interface with the office PC 603 when the user is at his/her office, with the mobile phone 701 when the user is within a certain proximity (e.g., distance) of the mobile phone 701, with the PDA 702 when the user is within a certain proximity of the PDA 702, etc. Regardless of the communications device communicating with the personal digital gateway 100, the data 306 may need to be configured and/or otherwise formatted for the most up-to-date connected communications device (including audio, text (e.g., ASCII), video, other digital formats, and combination thereof). Thus, the Edge Side Assembler 314 has the intelligence to identify configurations and formats of the most up-to-date connected communications device and to initiate integration and configuration the data 306 (including remote and/or linked) for presentation by the most up-to-date connected communications device, or alternatively, the personal digital assistant 100.

Figure 8:
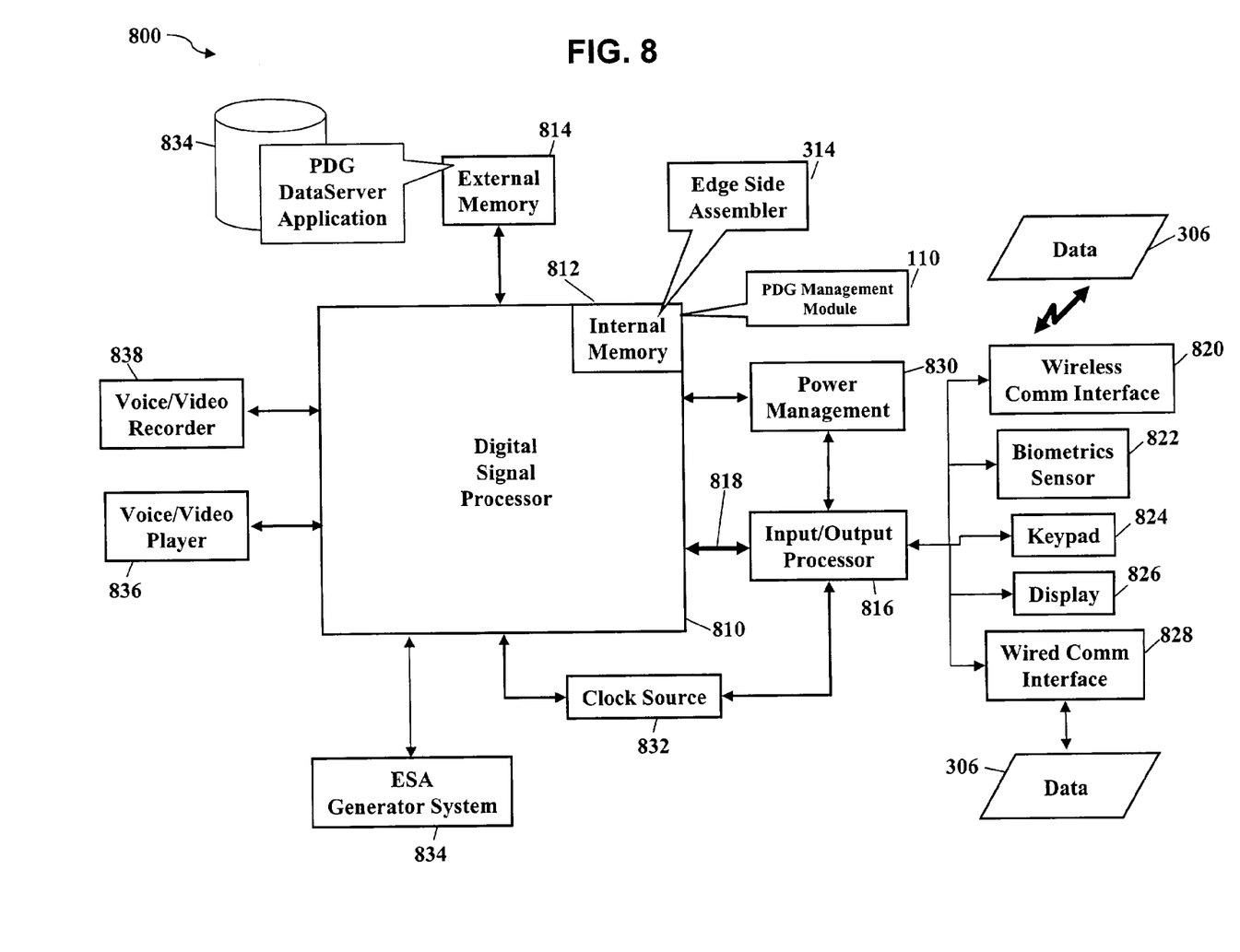
FIG. 8 is a block diagram of another exemplary PDG according to an embodiment of this invention.

FIG. 8 is a block diagram of another personal digital gateway 800 embodying this invention. This apparatus allows an Edge Side Assembler 314 to generate or otherwise integrate and/or configure data 306 (including remote and/or linked data) for presentation by a connected communications device. The personal digital gateway 800 includes the PDG Management Module 110 operating within a memory device of a digital signal processor 810. The memory device could include internal memory 812 of the digital signal processor 810, or the memory device could include an external memory 814 communicating with the digital signal processor 810. The digital signal processor 810 converts analog signals to digital signals and converts digital signals to analog signals. The digital signal processor 810 could include compression and decompression algorithms, cancellation algorithms, audio-processing circuitry, filter circuitry, and amplifier circuitry. Although digital signal processors can be designed to provide differing capabilities and a variety of performance criteria, the basic functions of the digital signal processor are known and, thus, will not be further discussed.

The digital signal processor 810 interfaces with an input/output processor 816. The input/output processor 816 controls system input/output and provides telephony and/or computer control features. A bus 818 provides a signal communication path between the digital signal processor 810 and the input/output processor 816. The input/output processor 816 is a microprocessor that includes memory (not shown), communication controllers (not shown), and peripheral controllers (not shown). The communication controllers, for example, could control packet-based communications with the connected communications device and a connected network through a wireless transceiver 820 or through a wired communications port 828. The communication controllers could also control packet-based communications with a communications switch (shown as reference numeral 650 in FIGS. 6-7). The peripheral controllers provide an interface with an LCD/LED/CRT display 826 and with telephony/computer-like control features, such as a keypad 824. Additionally, the peripheral controllers provide an interface with a biometrics sensor 822, such as, for example, a fingerprint ID device. The biometrics sensor 822 may provide security features that prevent unauthorized users from exploiting personal digital gateway 800. The biometrics sensor 872 could also comprise retina recognition device and software, DNA/RNA recognition device and software, facial recognition device and software, speech recognition device and software, and/or scent recognition device and software.

The digital signal processor 800 also interfaces with an external voice/video player system 836 and/or with a voice/video recorder system 838 to audibly and/or visually communicate data. Further, a clock source 832 provides a system clock for the apparatus 800, and the clock source 832 may also include higher and lower frequency multiples of the system clock depending upon power requirements and power availability. Still further, a power management system 830 provides differing power control mechanisms, such as a sleep mode and a low-power mode, to efficiently utilize available power and to reduce thermal management concerns.

The personal digital gateway 800 access, integrates, configures, and/or otherwise generates the data 306 for presentation to the connected communications device. If, for example, the personal digital gateway 800 communicates with a PDA (shown as reference numeral 702 in FIG. 7), the PDG Management Module 110 may appear on the display 804 and/or otherwise cause the personal digital gateway 800 to visually or audibly alert the user of the connection with the PDA. Thereafter, the wireless communications interface 820 (or alternatively the wired communications interface 828) communicates the data 306 via a communications link to the PDA. The data 306 may include information associated with the PDG Rule-Based Profile 304. When the data 306 is communicated, the digital signal processor 810 interfaces with the PDG Management Module 110 and with the internal memory 812 and/or the external memory 814. The PDG Management Module 110 instructs the digital signal processor 810 to initiate the Edge Side Assembler 314 to access, integrate, configure, and/or otherwise process the data 306 stored in the memory device and the data received from remote and/or linked sources. Once the data is accessed and retrieved (if remote and/or linked data), the personal digital gateway 800 generates and/or otherwise integrates the data for communication with the connected communications device. The digital signal processor 10 interfaces with an Edge Side Assembler (ESA) Generator System 834. The ESA Generator System 834 executes the presentation format for the connected communications device, populates associated fields and/or files, and presents the data 306.

While several exemplary implementations of embodiments of this invention are described herein, various modifications and alternate embodiments will occur to those of ordinary skill in the art. Accordingly, this invention is intended to include those other variations, modifications, and alternate embodiments that adhere to the spirit and scope of this invention.

What is claimed is:

1. A method, comprising the steps of:
    identifying data according to a rule-based engine to categorize the data as at least one of (1) data associated with an access agent, (2) data associated with a configuration agent, (3) data associated with a security agent, and (4) data associated with a management agent, wherein the data is associated with a common user of a personal digital gateway and of at least one of a communications network and a communications device selected from a plurality of communications devices;
    using the access agent to locate remote data, the remote data stored on at least one of the network and the selected communications device;
    using the configuration agent to configure a query to retrieve the remote data, the configuration agent associated with a configuration profile for at least one of the network and the selected communications device;
    using the security agent to access the at least one of the network and the selected communications device to retrieve the remote data;
    integrating the data and the remote data; and
    using the configuration agent to format the integrated data for a presentation format to the selected communications device,
    wherein the personal digital gateway enables communication of at least one of the data, the remote, and the integrated data with each communications device of a plurality of communications devices, the plurality of communications devices comprising a wireless communications device, a mobile phone, a wireless phone, a WAP phone, an IP phone, a satellite phone, a computer, a modem, a pager, a digital music device, a digital recording device, a personal digital assistant, an interactive television, a digital signal processor, and a Global Positioning System device.

2. The method of claim 1, further comprising the step of: using the management agent to copy, edit, delete, store, compress, uncompress, and manage at least one of the data, remote date, the integrated data, and the formatted, integrated data.

3. The method of claim 1, further comprising the step of: encrypting at least one of the data, remote date, and the formatted, integrated data.

4. The method of claim 1, further comprising the step of: decrypting at least one of the data, remote date, and the formatted, integrated data.

5. The method of claim 1, further comprising the step of: communicating the formatted, integrated data with the selected communications device.

6. The method of claim 5, further comprising the step of: presenting the formatted, integrated data on the selected communications device.

7. The method of claim 1, further comprising the step of: presenting the formatted, integrated data on the personal digital gateway.

8. The method of claim 1, wherein the format of at least one of the data, the remote data, the integrated data, and the formatted, integrated data is at least one of a text format, a voice data format, a video data format, a dual tone multi-frequency data format, an analog data format, and a digital data format.

9. The method of claim 1, wherein the personal digital gateway comprises a database of the data.

10. The method of claim 1, wherein the step of identifying data comprises interpreting a personal digital gateway rule-based profile associated with at least one of the data and the remote data.

11. The method of claim 2, wherein the step of identifying data further comprises:
receiving data preferences, the data preferences independent of the personal digital gateway rule-based profile;
storing the data preferences to an edge side assembly profile, the edge side assembly profile associated with a frequency of receiving the data preferences; and
interpreting the edge side assembly profile.

12. The method of claim 1, wherein the access agent comprises rules associated with means of communicating with the at least one of the network and the selected communications device.

13. The method of claim 1, wherein the access agent further comprises rules associated with communications paths, routing instructions, and addresses associated with at least one of the data and the remote data.

14. The method of claim 1, wherein the configuration agent comprises rules associated with functionality of the at least one of the network and the selected communications device.

15. The method of claim 14, wherein the configuration agent comprises rules associated with presentation preferences of the common user.

16. The method of claim 1, wherein the security agent comprises rules associated with at least one of authenticity requirements, privacy requirements, and security requirement.

17. The method of claim 1, wherein the step of using the security agent to access at least one of the network and the selected communications device to retrieve the remote data further comprises:

verifying authenticity requirements associated of the at least one of the network and the selected communications device, the authenticity requirements associated with the common user; and
verifying security requirements associated with of the at least one of the network and the selected communications device, the security requirements associated with securing communications of the at least one of the network and the selected communications device.

18. The method of claim 1, wherein the management agent comprises rules associated with at least one of (i) editing the data, (ii) copying the data, (iii) deleting the data, (iv) linking the data, (v) storing the data, (vi) administering the data, (viii) compressing the data, and (ix) uncompressing the data.

19. The method of claim 1, wherein the data comprises at least one of the remote data, the integrated data, and the formatted, integrated data.

20. A method, comprising the steps of:
identifying data according to a rule-based engine to categorize the data as at least one of (1) data associated with an access agent, (2) data associated with a configuration agent, (3) data associated with a security agent, and (4) data associated with a management agent, wherein the data is associated with a common user of a personal digital gateway and of a communications device selected from a plurality of communications devices;
using the access agent to locate remote data, the remote data stored on the selected communications device;
using the configuration agent to configure a query to retrieve the remote data, the configuration agent associated with a configuration profile for the selected communications device;
using the security agent to access the selected communications device to retrieve the remote data;
integrating the data and the remote data; and
using the configuration agent to format the integrated data for a presentation format to the selected communications device,
wherein the personal digital gateway enables communication of at least one of the data, the remote, and the integrated data with the each communications device of the plurality of communications devices, the plurality of communications devices comprising a wireless communications device, a mobile phone, a wireless phone, a WAP phone, an IP phone, a satellite phone, a computer, a modem, a pager, a digital music device, a digital recording device, a personal digital assistant, an interactive television, a digital signal processor, and a Global Positioning System device.

21. A method, comprising the steps of:
identifying data according to a rule-based engine to categorize the data as at least one of (1) data associated with an access agent, (2) data associated with a configuration agent, (3) data associated with a security agent, and (4) data associated with a management agent, wherein the data is associated with a common user of a personal digital gateway and of a communications network;
using the access agent to locate remote data, the remote data stored on the communications network;
using the configuration agent to configure a query to retrieve the remote data, the configuration agent associated with a configuration profile for the communications network;

using the security agent to access the network to retrieve the remote data;
integrating the data and the remote data; and
using the configuration agent to format the integrated data for a presentation format to the personal digital gateway,
wherein the personal digital gateway enables communication of at least one of the data, the remote, and the integrated data with each communications device of a plurality of communications devices, the plurality of communications devices comprising a wireless communications device, a mobile phone, a wireless phone, a WAP phone, an IP phone, a satellite phone, a computer, a modem, a pager, a digital music device, a digital recording device, a personal digital assistant, an interactive television, a digital signal processor, and a Global Positioning System device.

* * * * *